(12) United States Patent
Fujinoki et al.

(10) Patent No.: US 12,315,874 B2
(45) Date of Patent: May 27, 2025

(54) SOLID ELECTROLYTE AND BATTERY USING SAME

(71) Applicant: Panasonic Intellectual Property Management Co., Ltd., Osaka (JP)

(72) Inventors: Norihito Fujinoki, Osaka (JP); Masashi Sakaida, Hyogo (JP); Kenta Nagamine, Osaka (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 723 days.

(21) Appl. No.: 17/329,145

(22) Filed: May 25, 2021

(65) Prior Publication Data

US 2021/0280907 A1    Sep. 9, 2021

Related U.S. Application Data

(63) Continuation of application No. PCT/JP2019/042908, filed on Oct. 31, 2019.

(30) Foreign Application Priority Data

| Dec. 26, 2018 | (JP) | 2018-243602 |
| Dec. 26, 2018 | (JP) | 2018-243603 |
| Dec. 26, 2018 | (JP) | 2018-243604 |
| Dec. 26, 2018 | (JP) | 2018-243605 |
| Dec. 28, 2018 | (JP) | 2018-248594 |

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC .................................................. H01M 10/0562
See application file for complete search history.

(56) References Cited

U.S. PATENT DOCUMENTS

2011/0272585 A1    11/2011   Yang et al.
2013/0230778 A1*    9/2013   Saimen ............. H01M 10/0525
                                                                429/303

(Continued)

FOREIGN PATENT DOCUMENTS

CN    107794566 A    3/2018
CN    108004591      5/2018

(Continued)

OTHER PUBLICATIONS

Tetsuya Asano, et. al., Solid Halide Electrolytes with High Lithium-Ion Conductivity for Application in 4 V Class Bulk-Type All-Solid-State Batteries, Sep. 14, 2018, Advanced Materials, vol. 30, issue 44, 1-7 (Year: 2018).*

(Continued)

*Primary Examiner* — Matthew T Martin
*Assistant Examiner* — Krishna R Hammond
(74) *Attorney, Agent, or Firm* — Rimon P.C.

(57) ABSTRACT

A solid electrolyte consists essentially of Li, M, and X. M includes at least one element selected from the group consisting of Gd, Tb, and Sm. X is at least one element selected from the group consisting of Cl, Br, and I.

13 Claims, 3 Drawing Sheets

(56) References Cited

U.S. PATENT DOCUMENTS

| | | | |
|---|---|---|---|
| 2016/0103232 A1 | 4/2016 | Ouspenski et al. | |
| 2017/0139059 A1 | 5/2017 | Ouspenski et al. | |
| 2018/0246230 A1 | 8/2018 | Ouspenski et al. | |
| 2018/0277830 A1* | 9/2018 | Xing | H01M 4/366 |
| 2019/0088995 A1 | 3/2019 | Asano et al. | |
| 2019/0097267 A1 | 3/2019 | Yokoyama et al. | |
| 2019/0107636 A1 | 4/2019 | Ouspenski et al. | |
| 2019/0245240 A1 | 8/2019 | Park et al. | |
| 2020/0212481 A1 | 7/2020 | Nagamine et al. | |
| 2020/0335817 A1 | 10/2020 | Asano et al. | |

FOREIGN PATENT DOCUMENTS

| | | | | |
|---|---|---|---|---|
| CN | 108701860 A | * | 10/2018 | ......... C01F 17/0031 |
| CN | 108899580 A | | 11/2018 | |
| CN | 109075390 A | | 12/2018 | |
| CN | 111279432 A | | 6/2020 | |
| CN | 111295789 A | | 6/2020 | |
| EP | 2043188 A1 | * | 4/2009 | ............ H01G 11/12 |
| EP | 3496202 A1 | | 6/2019 | |
| EP | 3736820 A1 | | 11/2020 | |
| EP | 3736831 A4 | | 3/2021 | |
| EP | 3736833 A4 | | 3/2021 | |
| EP | 3736834 A4 | | 3/2021 | |
| EP | 3736897 A4 | | 3/2021 | |
| EP | 3745422 A4 | | 3/2021 | |
| JP | 2006-244734 | | 9/2006 | |
| JP | 2016-522135 | | 7/2016 | |
| JP | 2017-168395 A | | 9/2017 | |
| JP | 2017-220339 | | 12/2017 | |
| JP | 2017220339 A | * | 12/2017 | |
| JP | 2019-513687 | | 5/2019 | |
| KR | 20200046296 A | * | 5/2020 | |
| WO | 2018/025582 | | 2/2018 | |
| WO | 2018/062770 A1 | | 4/2018 | |

OTHER PUBLICATIONS

Xudong Meng, et. al., Effects of samarium doping on the electrochemical performance of LiFePO4/C cathode material for lithium-ion batteries, Feb. 2016, vol. 42, Issue 2, 2599-2604 (Year: 2016).*

International Search Report of PCT application No. PCT/JP2019/042908 dated Nov. 26, 2019.

Andreas Bohnsack et al., "The bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

H.-J. Steiner et al., "Novel Fast Ion Conductors of the Type MI3MIIICI6 (MI=Li, Na, Ag; MIII=In, Y)", Zeitschrift fur anorganische und allgemeine Chemie, Jul. 1992, vol. 613, pp. 26-30 (Partial Translation).

English Translation of Chinese Search Report dated Dec. 5, 2022 for the related Chinese Patent Application No. 201980062307.5.

English Translation of Chinese Search Report dated Dec. 28, 2022 for the related Chinese Patent Application No. 201980060798.X.

The Indian Office Action dated Dec. 29, 2022 for the related Indian Patent Application No. 202147024385.

The Indian Office Action dated Jan. 20, 2023 for the related Indian Patent Application No. 202147024572.

The Extended European Search Report dated Jan. 21, 2022 for the related European Patent Application No. 19902576.8.

The Extended European Search Report dated Jan. 28, 2022 for the related European Patent Application No. 19901581.9.

The Extended European Search Report dated Jan. 13, 2022 for the related European Patent Application No. 19902261.7.

The Extended European Search Report dated Jan. 28, 2022 for the related European Patent Application No. 19902747.5.

The Extended European Search Report dated Jan. 14, 2022 for the related European Patent Application No. 19904337.3.

The Extended European Search Report dated Jan. 14, 2022 for the related European Patent Application No. 19905741.5.

Tetsuya Asano et al., "Solid Halide Electrolytes with High Lithium-Ion Conductivity for Application in 4 V Class Bulk-Type All-Solid-State Batteries", Advanced Materials, vol. 30, No. 44, Sep. 14, 2018 (Sep. 14, 2018), pp. 1-7, XP055721991.

Kwon Young-Soon et al., "Ball temperatures during mechanical alloying in planetary mills", Journal of Alloys and Compounds, vol. 346, No. 1, Jan. 1, 2002 (Jan. 1, 2002), pp. 276-281, XP085622434.

English Translation of Chinese Search Report dated Aug. 11, 2023 for the related Chinese Patent Application No. 201980069385.8.

English Translation of Chinese Search Report dated Mar. 30, 2023 for the related Chinese Patent Application No. 201980066255.9.

* cited by examiner

SOLID ELECTROLYTE AND BATTERY USING SAME

BACKGROUND

1. Technical Field

The present disclosure relates to a solid electrolyte and a battery using the same.

2. Description of the Related Art

International Publication No. 2018/025582 discloses a solid electrolyte represented by a composition formula $Li_{6-3z}Y_zX_6$ (where $0<z<2$ and $X=Cl$ or $Br$).

Japanese Patent No. 5108205 discloses $Li_3InBr_6$ and $Li_3InBr_3Cl_3$.

SUMMARY

One non-limiting and exemplary embodiment provides a solid electrolyte having high lithium ion conductivity.

In one general aspect, the techniques disclosed here feature a solid electrolyte consisting essentially of Li, M, and X, wherein M includes at least one element selected from the group consisting of Gd, Tb, and Sm, and X is at least one element selected from the group consisting of Cl, Br, and I.

The present disclosure provides a solid electrolyte having high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the accompanying drawings.

Hereafter, a solid electrolyte used in a battery will be described. However, the application of the solid electrolyte according to the present disclosure is not limited to a battery. The solid electrolyte according to the present disclosure may be used in an electrochemical device such as an ion concentration sensor.

First Embodiment

A solid electrolyte according to the first embodiment includes Li, M, and X. M includes at least one element selected from the group consisting of Gd, Tb, and Sm. X is at least one element selected from the group consisting of Cl, Br, and I. The solid electrolyte according to the first embodiment has high lithium ion conductivity.

The solid electrolyte according to the first embodiment can be used for obtaining a battery having good charge/discharge characteristics. An example of the battery is an all-solid secondary battery.

The solid electrolyte according to the first embodiment is preferably free of sulfur. A solid electrolyte free of sulfur is good in terms of safety because no hydrogen sulfide is generated even when the solid electrolyte is exposed to air. Such a solid electrolyte can be used for obtaining a battery that is good in terms of safety.

To enhance ionic conductivity of the solid electrolyte, the solid electrolyte according to the first embodiment may consist essentially of Li, M, and X. Herein, the expression "the solid electrolyte according to the first embodiment consists essentially of Li, M, and X" means that the molar ratio of the total amount of Li, M, and X relative to the total amount of all elements constituting the solid electrolyte according to the first embodiment is greater than or equal to 90%. For example, the molar ratio may be greater than or equal to 95%. The solid electrolyte according to the first embodiment may consist of Li, M, and X.

The solid electrolyte according to the first embodiment may contain an element that is unavoidably mixed. An example of the element is hydrogen, nitrogen, or oxygen. Such an element can be present in raw material powders of the solid electrolyte material or in the atmosphere for producing or storing the solid electrolyte material.

To enhance the ionic conductivity of the solid electrolyte, M may include a metal element other than Gd, Tb, and Sm. An example of the metal element other than Gd, Tb, and Sm is Y (that is, yttrium).

X may be at least two elements selected from the group consisting of Cl, Br, and I. Such a solid electrolyte has higher lithium ion conductivity. When the solid electrolyte includes greater than or equal to two anions with different ionic radii, distortion of crystal lattices or a decrease in binding energy occurs. The distortion of crystal lattices or the decrease in binding energy increases the lithium ion conductivity.

As electronegativity of X increases, the solid electrolyte has higher reduction resistance. Therefore, when X includes greater than or equal to two elements, the solid electrolyte has both high ionic conductivity and high reduction resistance.

The solid electrolyte according to the first embodiment may be a compound represented by the following composition formula (1).

$$Li_{3-3\delta}M_{1+\delta}Cl_xBr_yI_z \qquad \text{Formula (1)}$$

Here, the following mathematical formulae are satisfied:

$-1<\delta<1$, $0 \le x \le 6$, $0 \le y \le 6$, $0 \le z \le 6$, and $x+y+z=6$.

The solid electrolyte represented by composition formula (1) has high lithium ion conductivity.

To further enhance reduction resistance of the solid electrolyte, a mathematical formula $0<x\leq6$ may be satisfied. That is, X may include Cl.

To further enhance ionic conductivity of the solid electrolyte, a mathematical formula $0<z\leq6$ may be satisfied. That is, X may include I.

To enhance both ionic conductivity and reduction resistance of the solid electrolyte, mathematical formulae $0<x\leq6$ and $0<z\leq6$ may be satisfied. That is, X may include Cl and I.

To enhance ionic conductivity of the solid electrolyte, a mathematical formula $0<y+z\leq6$ may be satisfied. That is, X may include at least one element selected from the group consisting of Br and I.

To enhance both reduction resistance and ionic conductivity of the solid electrolyte, mathematical formulae $0<x\leq6$ and $0<y+z\leq6$ may be satisfied. That is, X may be Cl and at least one element selected from the group consisting of Br and I.

To enhance ionic conductivity of the solid electrolyte, a mathematical formula $x=0$ may be satisfied. That is, X may be at least one element selected from the group consisting of Br and I.

To further enhance ionic conductivity of the solid electrolyte, M may include Gd, and mathematical formulae $z=0$ and $2\leq x\leq4$ may be satisfied.

To further enhance ionic conductivity of the solid electrolyte, M may include Tb, and mathematical formulae $z=0$ and $x<y$ may be satisfied.

To further enhance ionic conductivity of the solid electrolyte, M may include Sm, and mathematical formulae $0\leq x<6$, $0\leq y<6$, and $0\leq z<6$ may be satisfied.

In composition formula (1), δ represents the amount of Li deficiency from the stoichiometric ratio. To enhance ionic conductivity of the solid electrolyte, a mathematical formula $-0.5\leq\delta\leq0.5$ may be satisfied.

To enhance ionic conductivity of the solid electrolyte, a mathematical formula $-0.1\leq\delta\leq0.25$ may be satisfied.

The solid electrolyte according to the first embodiment may be crystalline or amorphous. In view of lithium ion conductivity, the solid electrolyte according to the first embodiment is preferably amorphous.

The solid electrolyte according to the first embodiment may have any shape. The shape of the solid electrolyte according to the first embodiment may be, for example, acicular, spherical, or ellipsoidal. The solid electrolyte according to the first embodiment may be particulate. The solid electrolyte according to the first embodiment may be formed in a pellet shape or a sheet shape.

When the solid electrolyte according to the first embodiment is particulate (for example, spherical), the solid electrolyte material according to the first embodiment may have a median diameter of greater than or equal to 0.1 μm and less than or equal to 100 μm, and preferably may have a median diameter of greater than or equal to 0.5 μm and less than or equal to 10 μm. This provides the solid electrolyte according to the first embodiment with high ionic conductivity. Furthermore, the solid electrolyte according to the first embodiment and other materials can be satisfactorily dispersed.

To satisfactorily disperse the solid electrolyte according to the first embodiment and an active material, the solid electrolyte according to the first embodiment may have a smaller median diameter than the active material.

Method for Producing Solid Electrolyte

The solid electrolyte according to the first embodiment can be produced by the following method.

Halide raw material powders are mixed so as to have a desired composition. For example, when the desired composition is $Li_{2.9}Gd_{1.1}Br_3Cl_3$, LiCl, $GdCl_3$, and $GdBr_3$ are mixed in a LiCl:$GdCl_3$:$GdBr_3$ molar ratio of 2.9:0.1:1. The raw material powders may be mixed in a pre-adjusted molar ratio so as to offset a compositional change in the solid electrolyte, the compositional change being possibly caused in the synthesis process. The values of δ, x, y, and z are determined by the selection of the types of raw material powders, the molar ratio of the raw material powders, and the synthesis process.

The raw material powders in the mixture are mechanochemically reacted with each other in a mixing apparatus, such as a planetary ball mill, (that is, by a mechanochemical milling method) to obtain a reaction product. The reaction product may be baked in a vacuum or in an inert atmosphere. Alternatively, the mixture of the raw material powders may be baked in a vacuum or in an inert atmosphere.

The baking may be performed at a temperature higher than or equal to 100° C. and lower than or equal to 650° C. for greater than or equal to one hour.

The solid electrolyte according to the first embodiment is prepared by these methods.

Second Embodiment

A second embodiment will be described below. The matters described in the first embodiment may be appropriately omitted.

A battery according to the second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte according to the first embodiment. The battery according to the second embodiment has high charge/discharge characteristics.

Figure 1:
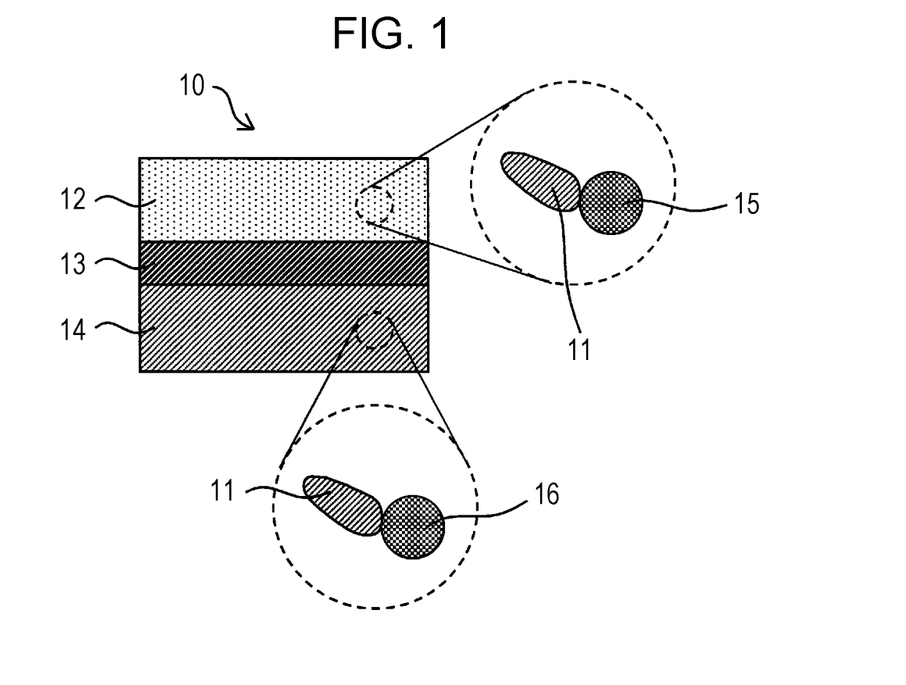
FIG. 1 is a sectional view of a battery 10 according to a second embodiment.

FIG. 1 is a sectional view of a battery 10 according to the second embodiment.

The battery 10 according to the second embodiment includes a positive electrode 12, an electrolyte layer 13, and a negative electrode 14. The electrolyte layer 13 is disposed between the positive electrode 12 and the negative electrode 14.

The positive electrode 12 contains positive-electrode active material particles 15 and solid electrolyte particles 11.

The electrolyte layer 13 contains an electrolyte material (for example, a solid electrolyte).

The negative electrode 14 contains negative-electrode active material particles 16 and solid electrolyte particles 11.

The solid electrolyte particles 11 are particles that contain, as a main component, the solid electrolyte according to the first embodiment. The term "particles that contain, as a main component, the solid electrolyte according to the first embodiment" means particles that contain the solid electrolyte according to the first embodiment at the highest content. The solid electrolyte particles 11 may be particles composed of the solid electrolyte according to the first embodiment.

The positive electrode 12 contains a material capable of occluding and releasing metal ions such as lithium ions. The positive electrode 12 contains, for example, a positive-electrode active material (for example, positive-electrode active material particles 15).

Examples of the positive-electrode active material include lithium transition metal oxides, transition metal fluorides, polyanion materials, fluorinated polyanion materials, transition metal sulfides, transition metal oxyfluorides, transition metal oxysulfides, and transition metal oxynitrides. Examples of the lithium transition metal oxides include $LiNi_{1-d-f}Co_dAl_fO_2$ (where $0<d$, $0<f$, and $0<(d+f)<1$) and $LiCoO_2$.

The positive-electrode active material particles 15 may have a median diameter of greater than or equal to 0.1 µm and less than or equal to 100 µm. When the positive-electrode active material particles 15 have a median diameter of greater than or equal to 0.1 µm, the positive-electrode active material particles 15 and the solid electrolyte particles 11 can be satisfactorily dispersed in the positive electrode 12. Consequently, the charge/discharge characteristics of the battery are improved. When the positive-electrode active material particles 15 have a median diameter of less than or equal to 100 µm, the lithium diffusion rate in the positive-electrode active material particles 15 is improved. Consequently, the battery can operate with a high output.

The positive-electrode active material particles 15 may have a larger median diameter than the solid electrolyte particles 11. Consequently, the positive-electrode active material particles 15 and the solid electrolyte particles 11 can be satisfactorily dispersed.

From the viewpoint of the energy density and output of the battery, in the positive electrode 12, the ratio of the volume of the positive-electrode active material particles 15 relative to the total of the volume of the positive-electrode active material particles 15 and the volume of the solid electrolyte particles 11 may be greater than or equal to 0.30 and less than or equal to 0.95.

From the viewpoint of the energy density and output of the battery, the positive electrode 12 may have a thickness of greater than or equal to 10 µm and less than or equal to 500 µm.

The electrolyte layer 13 contains an electrolyte material. The electrolyte material is, for example, a solid electrolyte. That is, the electrolyte layer 13 may be a solid electrolyte layer. The electrolyte layer 13 may contain the solid electrolyte according to the first embodiment.

The electrolyte layer 13 may contain, as a main component, the solid electrolyte according to the first embodiment.

The electrolyte layer 13 may contain the solid electrolyte according to the first embodiment in an amount of 50% by mass or greater with respect to the total of the electrolyte layer 13. Consequently, the battery has high charge/discharge characteristics.

The electrolyte layer 13 may contain the solid electrolyte according to the first embodiment in an amount of 70% by mass or greater with respect to the total of the electrolyte layer 13. Consequently, the battery has high charge/discharge characteristics.

The electrolyte layer 13 contains, as a main component, the solid electrolyte according to the first embodiment and may further contain unavoidable impurities. Examples of the unavoidable impurities include (i) starting raw materials used for synthesizing the solid electrolyte, (ii) by-products of the solid electrolyte, and (iii) decomposition products of the solid electrolyte.

The electrolyte layer 13 may contain the solid electrolyte according to the first embodiment in an amount of 100% by mass with respect to the total of the electrolyte layer 13 except for impurities that are unavoidably mixed. Consequently, the battery has high charge/discharge characteristics.

The electrolyte layer 13 may be formed only of the solid electrolyte according to the first embodiment.

The electrolyte layer 13 may be formed only of a solid electrolyte different from the solid electrolyte according to the first embodiment. Examples of the solid electrolyte different from the solid electrolyte according to the first embodiment include $Li_2MgZ_4$, $Li_2FeX_4$, $Li(Al, Ga, In)Z_4$, $Li_3(Al, Ga, In)Z_6$, and LiI. Here, Z is at least one element selected from the group consisting of F, Cl, Br, and I.

Hereinafter, the solid electrolyte according to the first embodiment is referred to as a first solid electrolyte. The solid electrolyte different from the solid electrolyte according to the first embodiment is referred to as a second solid electrolyte.

The electrolyte layer 13 may contain not only the first solid electrolyte but also the second solid electrolyte. In the electrolyte layer 13, the first solid electrolyte and the second solid electrolyte may be uniformly dispersed.

A layer composed of the first solid electrolyte and a layer composed of the second solid electrolyte may be stacked in sequence in the stacking direction of the battery 10.

The electrolyte layer 13 may have a thickness of greater than or equal to 1 µm and less than or equal to 100 µm. When the electrolyte layer 13 has a thickness of greater than or equal to 1 µm, a short circuit between the positive electrode 12 and the negative electrode 14 is unlikely to occur. When the electrolyte layer 13 has a thickness of less than or equal to 100 µm, the battery can operate with a high output.

The negative electrode 14 contains a material capable of occluding and releasing metal ions such as lithium ions. The negative electrode 14 contains, for example, a negative-electrode active material (for example, negative-electrode active material particles 16).

Examples of the negative-electrode active material include metal materials, carbon materials, oxides, nitrides, tin compounds, and silicon compounds. The metal materials may be single metals or alloys. Examples of the metal materials include lithium metal and lithium alloys. Examples of the carbon materials include natural graphite, coke, carbon during graphitization, carbon fiber, spherical carbon, artificial graphite, and amorphous carbon. From the viewpoint of the capacity density, preferred examples of the negative-electrode active material include silicon (that is, Si), tin (that is, Sn), silicon compounds, and tin compounds.

The negative-electrode active material particles 16 may have a median diameter of greater than or equal to 0.1 µm and less than or equal to 100 µm. When the negative-electrode active material particles 16 have a median diameter of greater than or equal to 0.1 µm, the negative-electrode active material particles 16 and the solid electrolyte particles 11 can be satisfactorily dispersed in the negative electrode 14. Consequently, the charge/discharge characteristics of the battery are improved. When the negative-electrode active material particles 16 have a median diameter of less than or equal to 100 µm, the lithium diffusion rate in the negative-electrode active material particles 16 is improved. Consequently, the battery can operate with a high output.

The negative-electrode active material particles 16 may have a larger median diameter than the solid electrolyte particles 11. Consequently, the negative-electrode active material particles 16 and the solid electrolyte particles 11 can be satisfactorily dispersed.

From the viewpoint of the energy density and output of the battery, in the negative electrode 14, the ratio of the volume of the negative-electrode active material particles 16 to the total of the volume of the negative-electrode active material particles 16 and the volume of the solid electrolyte particles 11 may be greater than or equal to 0.30 and less than or equal to 0.95.

From the viewpoint of the energy density and output of the battery, the negative electrode 14 may have a thickness of greater than or equal to 10 μm and less than or equal to 500 μm.

At least one selected from the group consisting of the positive electrode 12, the electrolyte layer 13, and the negative electrode 14 may contain the second solid electrolyte in order to enhance ionic conductivity, chemical stability, and electrochemical stability.

The second solid electrolyte may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte may be an oxide solid electrolyte.

Examples of the oxide solid electrolyte include
(i) NASICON solid electrolytes such as $LiTi_2(PO_4)_3$ and element-substituted derivatives thereof;
(ii) perovskite solid electrolytes such as $(LaLi)TiO_3$;
(iii) LISICON solid electrolytes such as $Li_{14}ZnGe_4O_{16}$, $Li_4SiO_4$, $LiGeO_4$, and element-substituted derivatives thereof;
(iv) garnet solid electrolytes such as $Li_7La_3Zr_2O_{12}$ and element-substituted derivatives thereof, and
(v) $Li_3PO_4$ and N-substituted derivatives thereof.

The second solid electrolyte may be a halide solid electrolyte.

Examples of the halide solid electrolyte include $Li_2MgZ_4$, $Li_2FeZ_4$, $Li(Al, Ga, In)Z_4$, $Li_3(Al, Ga, In)Z_6$, and LiI where Z is at least one element selected from the group consisting of F, Cl, Br, and I.

Other examples of the halide solid electrolyte include compounds represented by $Li_aMe_bY_cX'_6$ where $a+mb+3c=6$ and $c>0$ are satisfied. Me is at least one element selected from the group consisting of metal elements other than Li and Y and metalloid elements. X is at least one element selected from the group consisting of F, Cl, Br, and I. The value of m represents the valence of Me. The "metalloid elements" represent B, Si, Ge, As, Sb, and Te. The "metal elements" represent all elements (excluding hydrogen) included in group 1 to group 12 in the periodic table and all elements (excluding B, Si, Ge, As, Sb, Te, C, N, P, O, S, and Se) included in group 13 to group 16 in the periodic table. From the viewpoint of ionic conductivity, Me may be at least one element selected from the group consisting of Mg, Ca, Sr, Ba, Zn, Sc, Al, Ga, Bi, Zr, Hf, Ti, Sn, Ta, and Nb.

The second solid electrolyte may be an organic polymer solid electrolyte.

Examples of the organic polymer solid electrolyte include compounds of a polymer and a lithium salt. The polymer compound may have an ethylene oxide structure. A polymer compound having an ethylene oxide structure can contain a large amount of lithium salt and can have further increased ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

At least one selected from the group consisting of the positive electrode 12, the electrolyte layer 13, and the negative electrode 14 may contain a non-aqueous electrolyte solution, gel electrolyte, or ionic liquid to facilitate lithium ion transfer and to improve the output characteristics of the battery 10.

The non-aqueous electrolyte solution contains a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, methyl fluoropropionate, fluorobenzene, fluoroethyl methyl carbonate, and fluorodimethylene carbonate. One non-aqueous solvent selected from these may be used alone, or a mixture of two or more non-aqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt may be, for example, greater than or equal to 0.5 mol/L and less than or equal to 2 mol/L.

The gel electrolyte may be a polymer material impregnated with a non-aqueous electrolyte solution. Examples of the polymer material include polyethylene oxide, polyacrylonitrile, polyvinylidene fluoride, polymethyl methacrylate, and polymers having an ethylene oxide bond.

Examples of cations included in the ionic liquid include
(i) aliphatic chain quaternary salts such as tetraalkylammonium and tetraalkylphosphonium,
(ii) alicyclic ammoniums such as pyrrolidiniums, morpholiniums, imidazoliniums, tetrahydropyrimidiniums, piperaziniums, and piperidiniums, and
(iii) nitrogen-containing heterocyclic aromatic cations such as pyridiniums and imidazoliums.

Examples of anions included in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

To improve the adhesion between particles, at least one selected from the group consisting of the positive electrode 12, the electrolyte layer 13, and the negative electrode 14 may contain a binder.

Examples of the binder include polyvinylidene fluoride, polytetrafluoroethylene, polyethylene, polypropylene, aramid resins, polyamides, polyimides, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyethersulfone, hexafluoropolypropylene, styrene-butadiene rubber, and carboxymethylcellulose. A copolymer may also be used as the binder. Examples of such a binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used as the binder.

To increase electronic conductivity, at least one selected from the positive electrode 12 and the negative electrode 14 may contain a conductive auxiliary agent.

Examples of the Conductive Auxiliary Agent Include
  (i) graphites such as natural graphite and artificial graphite,
  (ii) carbon blacks such as acetylene black and Ketjenblack,
  (iii) electrically conductive fibers such as carbon fibers and metal fibers,
  (iv) carbon fluoride,
  (v) metal powders such as an aluminum powder,
  (vi) electrically conductive whiskers such as zinc oxide whiskers and potassium titanate whiskers,
  (vii) electrically conductive metal oxides such as titanium oxide, and
  (viii) electrically conductive polymer compounds such as polyaniline, polypyrrole, and polythiophene. To reduce the cost, (i) or (ii) above may be used as the conductive auxiliary agent.

With respect to the shape of the battery according to the second embodiment, the battery is a coil battery, a cylindrical battery, a rectangular battery, a sheet battery, a button battery, a flat battery, or a laminated battery.

EXAMPLES

The present disclosure will be described in more detail with reference to the following Examples.

Example A1

Synthesis of Solid Electrolyte

In an argon atmosphere with a dew point of lower than or equal to −80° C. (hereinafter, referred to as a "dry argon atmosphere"), LiCl and $GdBr_3$ were prepared as raw material powders so as to have a $LiCL:GdBr_3$ molar ratio of 3:1. There materials were mixed by grinding in a mortar. The mixture was then subjected to milling treatment by using a planetary ball mill at 500 rpm for 12 hours so as to mechanochemically react with each other. Thus, a solid electrolyte according to Example A1 was prepared. The solid electrolyte according to Example A1 had a composition represented by $Li_3GdCl_3Br_3$.

Evaluation of Lithium Ion Conductivity

Figure 2:
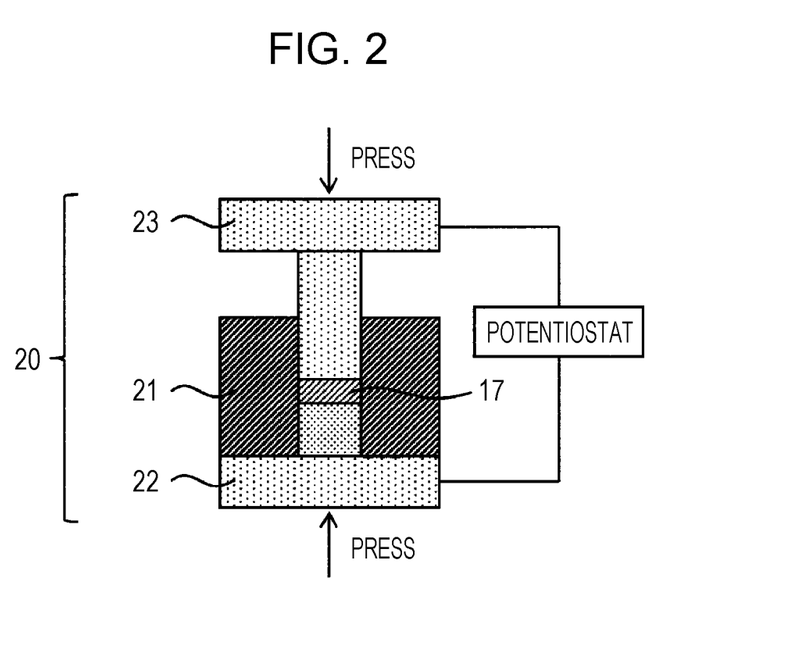
FIG. 2 is a schematic view of a press-forming die used for evaluating ionic conductivity of a solid electrolyte.

FIG. 2 is a schematic view of a press-forming die 20 used for evaluating ionic conductivity of a solid electrolyte.

A press-forming die 20 included a die 21, a lower punch 22, and an upper punch 23. The die 21 was formed of insulating polycarbonate. The lower punch 22 and the upper punch 23 were each electron conductive and formed of stainless steel.

The ionic conductivity of the solid electrolyte according to Example A1 was measured by the following method with the press-forming die 20 illustrated in FIG. 2.

In a dry argon atmosphere, the powder of the solid electrolyte according to Example A1 (that is, a solid electrolyte powder 17 in FIG. 2) was charged in the press-forming die 20. A pressure of 400 MPa was applied to the powder of the solid electrolyte according to Example A1 in the press-forming die 20 by using the lower punch 22 and the upper punch 23.

In the state where the pressure was applied, the lower punch 22 and the upper punch 23 were connected to a potentiostat (VersaSTAT 4 available from Princeton Applied Research) equipped with a frequency response analyzer. The upper punch 23 was connected to a working electrode and a potential measurement terminal. The lower punch 22 was connected to a counter electrode and a reference electrode. The ionic conductivity of the solid electrolyte was measured at room temperature by an electrochemical impedance measurement method.

Figure 3:
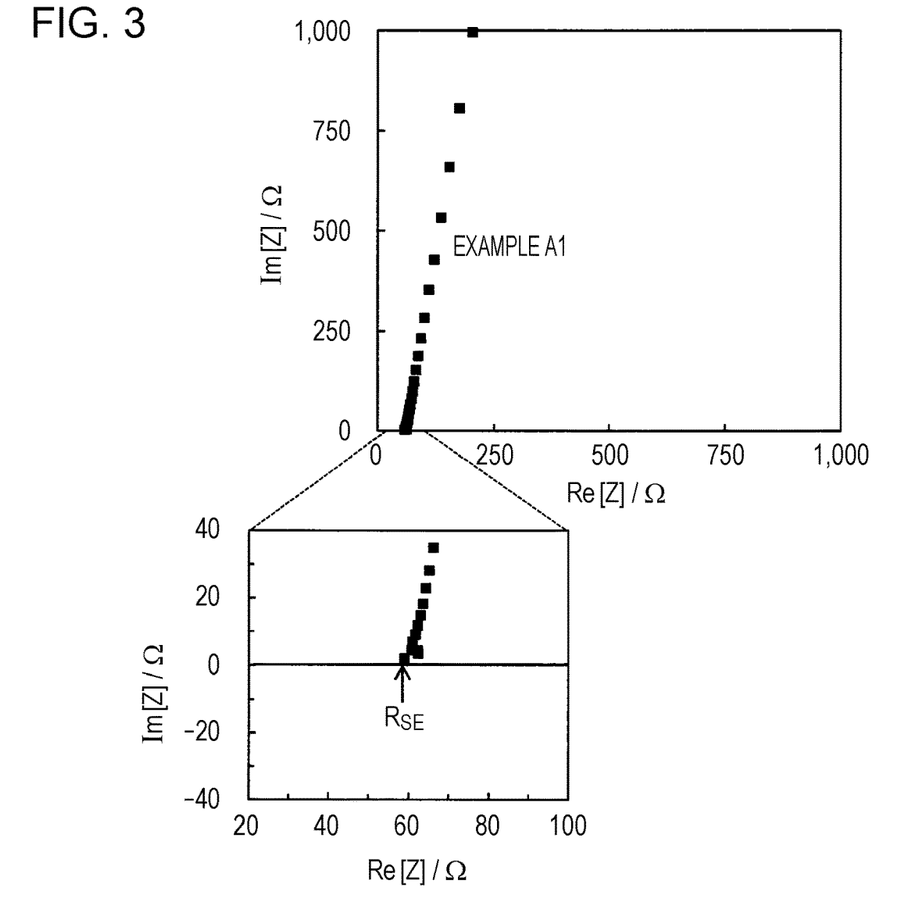
FIG. 3 is a graph showing a Cole-Cole plot of impedance measurement results of a solid electrolyte according to Example A1.

FIG. 3 is a Cole-Cole plot of the impedance measurement results of the solid electrolyte according to Example A1.

In FIG. 3, the real number of the complex impedance at a measurement point at which the absolute value of the phase of the complex impedance was smallest was considered to be the resistance to the ionic conduction of the solid electrolyte. For the real number, refer to the arrow $R_{SE}$ shown in FIG. 3.

The ionic conductivity was calculated by using the resistance on the basis of the following mathematical formula (2):

$$\sigma = (R_{SE} \times S/t)^{-1} \quad (2)$$

where σ represents the ionic conductivity, S represents the contact area between the solid electrolyte and the upper punch 23 (which is equal to the sectional area of the hollow portion in the die 21 in FIG. 2), $R_{SE}$ represents the resistance of the solid electrolyte in the impedance measurement, and t represents the thickness of the solid electrolyte under the pressure (which is equal to the thickness of the layer formed of the solid electrolyte powder 17 in FIG. 2). The ionic conductivity of the solid electrolyte according to Example A1 measured at 25° C. was $6.9 \times 10^{-4}$ S/cm.

Evaluation of Crystallinity

Figure 4:
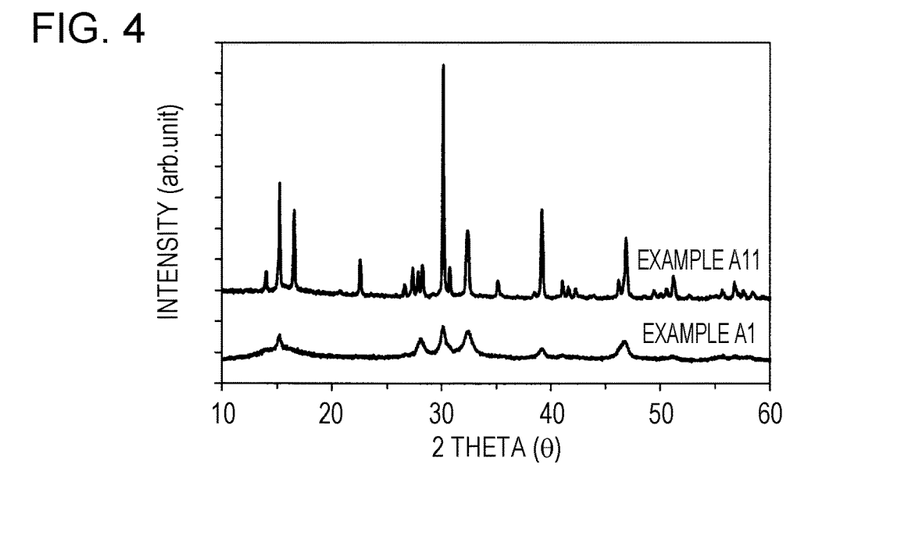
FIG. 4 is a graph showing X-ray diffraction patterns of solid electrolytes according to Examples A1 and A11.

The results shown in FIG. 4 were measured by the following method.

An X-ray diffraction pattern of the solid electrolyte according to Example A1 was measured by using an X-ray diffractometer (MiniFlex 600 available from Rigaku Corporation) in a dry environment with a dew point of lower than or equal to −45° C. As the X-ray source, Cu—Kα radiation was used.

FIG. 4 shows the X-ray diffraction pattern of the solid electrolyte according to Examples A1. The solid electrolyte according to Example A1 had peaks due to crystals of hexagonal structure. The peaks were broad.

Evaluation of Reduction Potential

In a dry argon atmosphere, the solid electrolyte according to Example A1 (50 mg, which was equal to the thickness of about 400 μm) and $Li_2S$—$P_2S_5$ (80 mg, which was equal to the thickness of about 700 μm) were stacked in an insulating tube with an inner diameter of 9.5 mm. A pressure of 300 MPa was applied to the resulting laminate to form solid electrolyte layers. $Li_2S$—$P_2S_5$ is hereinafter referred to as "LPS".

Next, a stainless steel foil with a thickness of 200 μm was stacked on the solid electrolyte layer formed from the solid electrolyte according to Example A1. Next, a metal Li foil with a thickness of 200 μm was stacked on the solid electrolyte layer formed from LPS. A pressure of 80 MPa was applied to the resulting laminate. Thus, a first electrode made of stainless steel and a second electrode made of metal Li were formed.

A current collector formed of stainless steel was attached to each of the first electrode and the second electrode, and a current collector lead was attached to each of the current collectors. Finally, an insulating ferrule was used to isolate the inside of the insulating tube from the outside air atmosphere and seal the inside of the tube. An evaluation cell was thus produced.

The evaluation cell produced as described above was placed in a thermostatic chamber at 25° C.

The electric potential was swept from a closed-circuit voltage to −0.2 V at a rate of 2 mV/sec with reference to the potential of the Li electrode. Subsequently, the electric potential was swept up to +2.0 V at a rate of 2 mV/sec.

Figure 5:
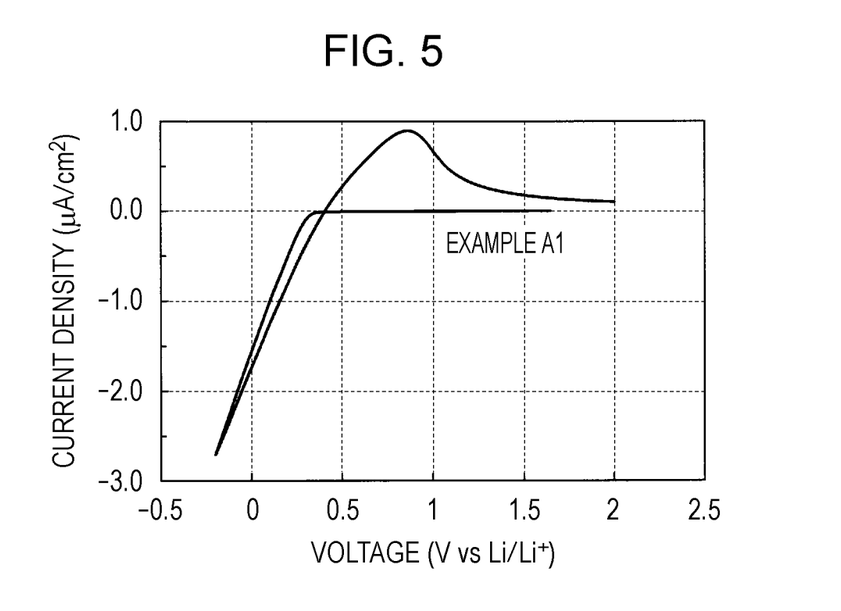
FIG. 5 is a graph showing measurement results of a cyclic voltammogram of the solid electrolyte according to Example A1.

Thus, the reduction potential of the solid electrolyte was evaluated by the measurement of the cyclic voltammogram. The results are shown in FIG. 5. The reduction potential of the solid electrolyte according to Example A1 with respect to the potential of the Li electrode was about 380 mV.

Preparation of Secondary Battery

In a dry argon atmosphere, the solid electrolyte according to Example A1 and $LiCoO_2$ were prepared in a solid electrolyte:$LiCoO_2$ volume ratio of 70:30. These materials were mixed in an agate mortar to obtain a mixture.

In an insulating tube having an inner diameter of 9.5 mm, the solid electrolyte according to Example A1 (80 mg, which was equal to the thickness of about 700 μm), the above mixture (8.54 mg), and a stainless steel foil (thickness: 200 μm) were stacked in this order. A pressure of 300 MPa was applied to the resulting laminate to form a first electrode and a solid electrolyte layer.

Next, a metal InLi having a thickness of 600 μm was stacked on the solid electrolyte layer. A pressure of 80 MPa was applied to the resulting laminate to form a second electrode.

A current collector formed of stainless steel was attached to each of the first electrode and the second electrode, and a current collector lead was attached to each of the current collectors. Finally, an insulating ferrule was used to isolate the inside of the insulating tube from the outside air atmosphere and seal the inside of the tube. A secondary battery according to Example A1 was thus produced. The secondary battery produced as described above was placed in a thermostatic chamber at 25° C.

The battery according to Example A1 was charged at a current density of 68 ρA/cm$^2$ to a voltage of 3.6 V. This current density corresponds to 0.05 C rate.

Subsequently, the battery according to Example A1 was discharged at a current density of 68 ρA/cm$^2$ to a voltage of 2.0 V. This current density corresponds to 0.05 C rate.

Figure 6:
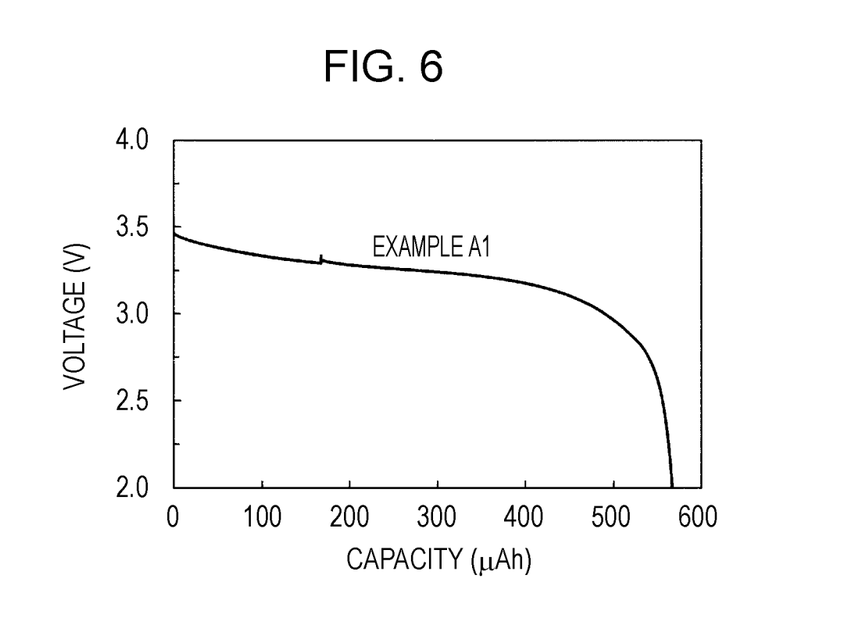
FIG. 6 is a graph showing the initial discharging characteristics of a secondary battery according to Example A1.

According to the results of the charge-discharge test, the secondary battery according to Example A1 had an initial discharge capacity of 570 ρAh. The results are shown in FIG. 6.

Examples A2 to A34

Synthesis of Solid Electrolyte

In Examples A2 to A4, LiBr, $GdCl_3$, and $GdBr_3$ were prepared as raw material powders so as to have a LiBr:$GdCl_3$:$GdBr_3$ molar ratio of (3-3δ):1:δ.

In Examples A5 to A7, LiBr, LiCl, and $GdCl_3$ were prepared as raw material powders so as to have a LiBr:LiCl:$GdCl_3$ molar ratio of 3:−3δ:(1+δ).

In Example A8, LiBr and $GdBr_3$ were prepared as raw material powders so as to have a LiBr:$GdBr_3$ molar ratio of 3:1.

In Example A9, LiI and $GdBr_3$ were prepared as raw material powders so as to have a LiI:$GdBr_3$ molar ratio of 3:1.

In Example A10, LiCl, LiI, $GdCl_3$, and $GdBr_3$ were prepared as raw material powders so as to have a LiCl:LiI:$GdCl_3$:$GdBr_3$ molar ratio of 3:6:1:2.

Solid electrolytes according to Examples A2 to A10 were obtained as in Example A1 except for the above.

In Example A11, the solid electrolyte according to Example A1 was subjected to annealing treatment in a dry argon atmosphere at 350° C. for one hour by using an electric baking furnace. Thus, a solid electrolyte according to Example A11 was obtained.

In Examples A12 to A20, the solid electrolytes according to Examples A2 to A10 were subjected to annealing treatment by the same method as that used in Example A11. Thus, solid electrolytes according to Examples A12 to A20 were obtained.

In Example A21, in a dry argon atmosphere, LiBr, $GdCl_3$, and $GdBr_3$ were prepared as raw material powders so as to have a LiBr:$GdCl_3$:$GdBr_3$ molar ratio of 2.91:1:0.03. These materials were mixed by grinding in a mortar. The resulting powder mixture was baked at 500° C. for 12 hours by using an electric baking furnace. Subsequently, the coarse particles were ground in a mortar. Thus, a solid electrolyte according to Example A21 was obtained.

In Example A22, LiBr, $GdCl_3$, and $GdBr_3$ were prepared as raw material powders so as to have a LiBr:$GdCl_3$:$GdBr_3$ molar ratio of 2.85:1:0.05.

In Example A23, LiCl, LiBr, and $GdCl_3$ were prepared as raw material powders so as to have a LiCl:LiBr:$GdCl_3$ molar ratio of 0.09:3:0.97.

In Example A24, LiCl, LiBr, and $GdCl_3$ were prepared as raw material powders so as to have a LiCl:LiBr:$GdCl_3$ molar ratio of 0.15:3:0.95.

In Examples A25, A29, and A33, LiBr, $GdCl_3$, and $GdBr_3$ were prepared as raw material powders so as to have a LiBr:$GdCl_3$:$GdBr_3$ molar ratio of 3:0.67:0.33.

In Examples A26 and A30, LiBr and $GdCl_3$ were prepared as raw material powders so as to have a LiBr:$GdCl_3$ molar ratio of 3:1.

In Examples A27, A31, and A34, LiCl, LiBr, and $GdCl_3$ were prepared as raw material powders so as to have a LiCl:LiBr:$GdCl_3$ molar ratio of 1:2:3.

In Examples A28 and A32, LiCl, LiBr, and $GdCl_3$ were prepared as raw material powders so as to have a LiCl:LiBr:$GdCl_3$ molar ratio of 2:1:1.

Solid electrolytes according to A22 to A34 were obtained as in Example A21 except for the types of raw material powders, the molar ratio of the raw material powders, and baking conditions.

The type of element M, the values of δ, x, y, and z, and baking conditions are shown in Table 1.

Evaluation of Lithium Ion Conductivity

Ionic conductivities of the solid electrolytes according to Examples A2 to A34 were measured as in Example A1. The measurement results are shown in Table 1.

Evaluation of Crystallinity

Crystallinity of the solid electrolyte according to Example A11 was evaluated as in Example A1. FIG. 4 shows the X-ray diffraction pattern of the solid electrolyte according to Example A11. The solid electrolyte according to Example A11 had peaks due to crystals of hexagonal structure as in Example A1. On the other hand, the peaks were sharper than those of Example A1.

Evaluation of Reduction Potential

Cyclic voltammograms of the solid electrolytes according to Examples A8 and A9 were measured as in Example A1. However, $L_{10}GP_2S_{12}$ was used instead of LPS.

The reduction potentials of the solid electrolytes according to Examples A8 and A9 with respect to the potential of the Li electrode were about 460 mV and 600 mV, respectively.

TABLE 1

| | Composition | M | δ | x | y | z | Annealing/Baking treatment temperature (° C.) | Annealing/Baking treatment time (h) | Conductivity (S/cm) |
|---|---|---|---|---|---|---|---|---|---|
| Example A1 | $Li_3GdCl_3Br_3$ | Gd | 0 | 3 | 3 | 0 | — | — | $6.9 \times 10^{-4}$ |
| Example A2 | $Li_{2.7}Gd_{1.1}Cl_3Br_3$ | Gd | 0.1 | 3 | 3 | 0 | — | — | $9.2 \times 10^{-4}$ |
| Example A3 | $Li_{2.25}Gd_{1.25}Cl_3Br_3$ | Gd | 0.25 | 3 | 3 | 0 | — | — | $5.6 \times 10^{-4}$ |
| Example A4 | $Li_{1.5}Gd_{1.5}Cl_3Br_3$ | Gd | 0.5 | 3 | 3 | 0 | — | — | $2.9 \times 10^{-4}$ |
| Example A5 | $Li_{3.3}Gd_{0.9}Cl_3Br_3$ | Gd | -0.1 | 3 | 3 | 0 | — | — | $3.4 \times 10^{-4}$ |
| Example A6 | $Li_{3.75}Gd_{0.75}Cl_3Br_3$ | Gd | -0.25 | 3 | 3 | 0 | — | — | $1.5 \times 10^{-4}$ |
| Example A7 | $Li_{4.5}Gd_{0.5}Cl_3Br_3$ | Gd | -0.5 | 3 | 3 | 0 | — | — | $2.6 \times 10^{-5}$ |
| Example A8 | $Li_3GdBr_6$ | Gd | 0 | 0 | 6 | 0 | — | — | $6.0 \times 10^{-4}$ |
| Example A9 | $Li_3GdBr_3I_3$ | Gd | 0 | 0 | 3 | 3 | — | — | $1.1 \times 10^{-3}$ |
| Example A10 | $Li_3GdBr_2Cl_2I_2$ | Gd | 0 | 2 | 2 | 2 | — | — | $6.0 \times 10^{-4}$ |
| Example A11 | $Li_3GdCl_3Br_3$ | Gd | 0 | 3 | 3 | 0 | 350 | 1 | $2.6 \times 10^{-3}$ |
| Example A12 | $Li_{2.7}Gd_{1.1}Cl_3Br_3$ | Gd | 0.1 | 3 | 3 | 0 | 350 | 1 | $2.9 \times 10^{-3}$ |
| Example A13 | $Li_{2.25}Gd_{1.25}Cl_3Br_3$ | Gd | 0.25 | 3 | 3 | 0 | 350 | 1 | $1.6 \times 10^{-3}$ |
| Example A14 | $Li_{1.5}Gd_{1.5}Cl_3Br_3$ | Gd | 0.5 | 3 | 3 | 0 | 350 | 1 | $2.1 \times 10^{-4}$ |
| Example A15 | $Li_{3.3}Gd_{0.9}Cl_3Br_3$ | Gd | -0.1 | 3 | 3 | 0 | 350 | 1 | $1.9 \times 10^{-3}$ |
| Example A16 | $Li_{3.75}Gd_{0.75}Cl_3Br_3$ | Gd | -0.25 | 3 | 3 | 0 | 350 | 1 | $7.4 \times 10^{-4}$ |
| Example A17 | $Li_{4.5}Gd_{0.5}Cl_3Br_3$ | Gd | -0.5 | 3 | 3 | 0 | 350 | 1 | $2.0 \times 10^{-4}$ |
| Example A18 | $Li_3GdBr_6$ | Gd | 0 | 0 | 6 | 0 | 300 | 1 | $2.4 \times 10^{-3}$ |
| Example A19 | $Li_3GdBr_3I_3$ | Gd | 0 | 0 | 3 | 3 | 300 | 1 | $3.2 \times 10^{-3}$ |
| Example A20 | $Li_3GdBr_2Cl_2I_2$ | Gd | 0 | 2 | 2 | 2 | 400 | 1 | $3.6 \times 10^{-3}$ |
| Example A21 | $Li_{2.91}Gd_{1.03}Cl_3Br_3$ | Gd | 0.03 | 3 | 3 | 0 | 500 | 12 | $2.5 \times 10^{-3}$ |
| Example A22 | $Li_{2.85}Gd_{1.05}Cl_3Br_3$ | Gd | 0.05 | 3 | 3 | 0 | 500 | 12 | $2.5 \times 10^{-3}$ |
| Example A23 | $Li_{3.09}Gd_{0.97}Cl_3Br_3$ | Gd | -0.03 | 3 | 3 | 0 | 500 | 12 | $2.5 \times 10^{-3}$ |
| Example A24 | $Li_{3.15}Gd_{0.95}Cl_3Br_3$ | Gd | -0.05 | 3 | 3 | 0 | 500 | 12 | $2.2 \times 10^{-3}$ |
| Example A25 | $Li_3GdCl_2Br_4$ | Gd | 0 | 2 | 4 | 0 | 500 | 12 | $2.1 \times 10^{-3}$ |
| Example A26 | $Li_3GdCl_3Br_3$ | Gd | 0 | 3 | 3 | 0 | 500 | 12 | $3.1 \times 10^{-3}$ |
| Example A27 | $Li_3GdCl_4Br_2$ | Gd | 0 | 4 | 2 | 0 | 500 | 12 | $2.9 \times 10^{-3}$ |
| Example A28 | $Li_3GdCl_5Br$ | Gd | 0 | 5 | 1 | 0 | 500 | 12 | $2.1 \times 10^{-8}$ |
| Example A29 | $Li_3GdCl_2Br_4$ | Gd | 0 | 2 | 4 | 0 | 450 | 12 | $2.2 \times 10^{-3}$ |
| Example A30 | $Li_3GdCl_3Br_3$ | Gd | 0 | 3 | 3 | 0 | 450 | 12 | $2.9 \times 10^{-3}$ |
| Example A31 | $Li_3GdCl_4Br_2$ | Gd | 0 | 4 | 2 | 0 | 450 | 12 | $2.9 \times 10^{-3}$ |
| Example A32 | $Li_3GdCl_5Br_4$ | Gd | 0 | 5 | 1 | 0 | 450 | 12 | $2.3 \times 10^{-8}$ |
| Example A33 | $Li_3GdCl_2Br_4$ | Gd | 0 | 2 | 4 | 0 | 500 | 3 | $2.2 \times 10^{-3}$ |
| Example A34 | $Li_3GdCl_4Br_2$ | Gd | 0 | 4 | 2 | 0 | 500 | 3 | $3.1 \times 10^{-3}$ |

Examples B1 to B22

Synthesis of Solid Electrolyte

In Example B1, LiCl and $TbBr_3$ were prepared as raw material powders so as to have a $LiCl:TbBr_3$ molar ratio of 3:1.

In Examples B2 to B5, LiBr, $TbCl_3$, and $TbBr_3$ were prepared as raw material powders so as to have a $LiBr:TbCl_3:TbBr_3$ molar ratio of (3-3δ):1:6.

In Examples B6 to B8, LiCl, LiBr, and $TbBr_3$ were prepared as raw material powders so as to have a $LiCl:LiBr:TbBr_3$ molar ratio of 1:(2-3δ):(1+δ).

In Example B9, LiBr and $TbBr_3$ were prepared as raw material powders so as to have a $LiBr:TbBr_3$ molar ratio of 3:1.

In Example B10, LiI and $TbBr_3$ were prepared as raw material powders so as to have a $LiI:TbBr_3$ molar ratio of 3:1.

In Example B11, LiCl, LiI, $TbCl_3$, and $TbBr_3$ were prepared as raw material powders so as to have a $LiCl:LiI:TbCl_3:TbBr_3$ molar ratio of 3:6:1:2.

Solid electrolytes according to Examples B1 to B11 were obtained as in Example A1 except for the above.

In Examples B12 to B22, solid electrolytes according to Examples B12 to B22 were respectively obtained by subjecting the solid electrolytes according to Examples B1 to B11 to the annealing treatment as in Example A11 except for the temperature of the annealing treatment. The temperatures of the annealing treatment are shown in Table 2.

Evaluation of Lithium Ion Conductivity

Ionic conductivities of the solid electrolytes according to Examples B1 to B22 were measured as in Example A1. The measurement results are shown in Table 2.

TABLE 2

| | Composition | M | δ | x | y | z | Annealing treatment temperature (° C.) | Conductivity (S/cm) |
|---|---|---|---|---|---|---|---|---|
| Example B1 | $Li_3TbCl_3Br_3$ | Tb | 0 | 3 | 3 | 0 | — | $7.6 \times 10^{-6}$ |
| Example B2 | $Li_3TbClBr_5$ | Tb | 0 | 1 | 5 | 0 | — | $2.0 \times 10^{-4}$ |
| Example B3 | $Li_{2.7}Tb_{1.1}ClBr_5$ | Tb | 0.1 | 1 | 5 | 0 | — | $3.2 \times 10^{-4}$ |
| Example B4 | $Li_{2.25}Tb_{1.25}ClBr_5$ | Tb | 0.25 | 1 | 5 | 0 | — | $3.4 \times 10^{-4}$ |
| Example B5 | $Li_{1.5}Tb_{1.5}ClBr_5$ | Tb | 0.5 | 1 | 5 | 0 | — | $1.1 \times 10^{-4}$ |
| Example B6 | $Li_{3.3}Tb_{0.9}ClBr_5$ | Tb | -0.1 | 1 | 5 | 0 | — | $1.1 \times 10^{-4}$ |
| Example B7 | $Li_{3.75}Tb_{0.75}ClBr_5$ | Tb | -0.25 | 1 | 5 | 0 | — | $4.5 \times 10^{-5}$ |
| Example B8 | $Li_{4.5}Tb_{0.5}ClBr_5$ | Tb | -0.5 | 1 | 5 | 0 | — | $8.3 \times 10^{-6}$ |
| Example B9 | $Li_3TbBr_6$ | Tb | 0 | 0 | 6 | 0 | — | $8.3 \times 10^{-4}$ |
| Example B10 | $Li_3TbBr_3I_3$ | Tb | 0 | 0 | 3 | 3 | — | $9.4 \times 10^{-4}$ |
| Example B11 | $Li_3TbCl2Br_2I_2$ | Tb | 0 | 2 | 2 | 2 | — | $1.5 \times 10^{-4}$ |
| Example B12 | $Li_3TbCl_3Br_3$ | Tb | 0 | 3 | 3 | 0 | 300 | $2.3 \times 10^{-5}$ |
| Example B13 | $Li_3TbClBr_5$ | Tb | 0 | 1 | 5 | 0 | 350 | $7.9 \times 10^{-4}$ |
| Example B14 | $Li_{2.7}Tb_{1.1}ClBr_5$ | Tb | 0.1 | 1 | 5 | 0 | 350 | $1.1 \times 10^{-3}$ |
| Example B15 | $Li_{2.25}Tb_{1.25}ClBr_5$ | Tb | 0.25 | 1 | 5 | 0 | 350 | $1.4 \times 10^{-3}$ |
| Example B16 | $Li_{1.5}Tb_{1.5}ClBr_5$ | Tb | 0.5 | 1 | 5 | 0 | 350 | $2.0 \times 10^{-4}$ |
| Example B17 | $Li_{3.3}Tb_{0.9}ClBr_5$ | Tb | -0.1 | 1 | 5 | 0 | 350 | $4.0 \times 10^{-4}$ |
| Example B18 | $Li_{3.75}Tb_{0.75}ClBr_5$ | Tb | -0.25 | 1 | 5 | 0 | 350 | $1.6 \times 10^{-4}$ |
| Example B19 | $Li_{4.5}Tb_{0.5}ClBr_5$ | Tb | -0.5 | 1 | 5 | 0 | 350 | $7.1 \times 10^{-6}$ |
| Example B20 | $Li_3TbBr_6$ | Tb | 0 | 0 | 6 | 0 | 450 | $2.4 \times 10^{-3}$ |

TABLE 2-continued

| Composition | M | δ | x | y | z | Annealing treatment temperature (° C.) | Conductivity (S/cm) |
|---|---|---|---|---|---|---|---|
| Example B21 | $Li_3TbBr_3I_3$ | Tb | 0 | 0 | 3 | 3 | 300 | $3.0 \times 10^{-3}$ |
| Example B22 | $Li_3TbCl_2Br_2I_2$ | Tb | 0 | 2 | 2 | 2 | 450 | $4.9 \times 10^{-4}$ |

Examples C1 to C5

Synthesis of Solid Electrolyte

In Example C1, LiBr and $SmBr_3$ were prepared as raw material powders so as to have a LiBr:$SmBr_3$ molar ratio of 3:1.

In Example C2, LiBr, LiI, and $SmBr_3$ were prepared as raw material powders so as to have a LiBr:LiI:$SmBr_3$ molar ratio of 1:2:1.

In Example C3, LiI and $SmBr_3$ were prepared as raw material powders so as to have a LiI:$SmBr_3$ molar ratio of 3:1.

In Example C4, LiI and $SmCl_3$ were prepared as raw material powders so as to have a LiI:$SmCl_3$ molar ratio of 3:1.

In Example C5, LiCl, LiI, $SmCl_3$, and $SmBr_3$ were prepared as raw material powders so as to have a LiCl:LiI:$SmCl_3$:$SmBr_3$ molar ratio of 3:6:1:2.

Solid electrolytes according to Examples C1 to C5 were obtained as in Example A1 except for the above.

Evaluation of Lithium Ion Conductivity

Ionic conductivities of the solid electrolytes according to Examples C1 to C5 were measured as in Example A1. The measurement results are shown in Table 3.

TABLE 3

| Composition | M | δ | x | y | z | Annealing treatment temperature (° C.) | Conductivity (S/cm) |
|---|---|---|---|---|---|---|---|
| Example C1 | $Li_3SmBr_6$ | Sm | 0 | 0 | 6 | 0 | — | $8.5 \times 10^{-6}$ |
| Example C2 | $Li_3SmBr_4I_2$ | Sm | 0 | 0 | 4 | 2 | — | $5.9 \times 10^{-4}$ |
| Example C3 | $Li_3SmBr_3I_3$ | Sm | 0 | 0 | 3 | 3 | — | $1.5 \times 10^{-3}$ |
| Example C4 | $Li_3SmCl_3I_3$ | Sm | 0 | 3 | 0 | 3 | — | $6.6 \times 10^{-5}$ |
| Example C5 | $Li_3SmCl_2Br_2I_2$ | Sm | 0 | 2 | 2 | 2 | — | $3.5 \times 10^{-4}$ |

Examples D1 to D19

Synthesis of Solid Electrolyte

In Example D1, in a dry argon atmosphere, LiBr, $GdCl_3$, and $YCl_3$ were prepared as raw material powders so as to have a LiBr:$GdCl_3$:$YCl_3$ molar ratio of 3:0.7:0.3. These materials were mixed by grinding in a mortar. The resulting powder mixture was baked in an electric baking furnace at 500° C. for 12 hours to obtain a baked product. Subsequently, the baked product was ground in a mortar. Thus, a solid electrolyte according to Example D1 was obtained.

In Examples D2 and D17, LiBr, $GdCl_3$, and $YCl_3$ were prepared as raw material powders so as to have a LiBr:$GdCl_3$:$YCl_3$ molar ratio of 3:0.5:0.5.

In Examples D3 and D18, LiBr, $GdCl_3$, and $YCl_3$ were prepared as raw material powders so as to have a LiBr:$GdCl_3$:$YCl_3$ molar ratio of 3:0.3:0.7.

In Example D4, LiBr, $GdCl_3$, $GdBr_3$, and $YCl_3$ were prepared as raw material powders so as to have a LiBr:$GdCl_3$:$GdBr_3$:$YCl_3$ molar ratio of 3:0.57:0.33:0.1.

In Examples D5 and D12, LiBr, $GdCl_3$, and $YBr_3$ were prepared as raw material powders so as to have a LiBr:$GdCl_3$:$YBr_3$ molar ratio of 3:0.67:0.33.

In Examples D6 and D13, LiBr, $GdCl_3$, $YCl_3$, and $YBr_3$ were prepared as raw material powders so as to have a LiBr:$GdCl_3$:$YCl_3$:$YBr_3$ molar ratio of 3:0.5:0.17:0.33.

In Examples D7 and D14, LiBr, $GdCl_3$, $YCl_3$, and $YBr_3$ were prepared as raw material powders so as to have a LiBr:$GdCl_3$:$YCl_3$:$YBr_3$ molar ratio of 3:0.3:0.37:0.33.

In Examples D8 and D15, LiBr, $GdCl_3$, $YCl_3$, and $YBr_3$ were prepared as raw material powders so as to have a LiBr:$GdCl_3$:$YCl_3$:$YBr_3$ molar ratio of 3:0.1:0.57:0.33.

In Example D9, LiCl, LiBr, $GdCl_3$, and $YCl_3$ were prepared as raw material powders so as to have a LiCl:LiBr:$GdCl_3$:$YCl_3$ molar ratio of 1:2:0.9:0.1.

In Example D10, LiCl, LiBr, $GdCl_3$, and $YCl_3$ were prepared as raw material powders so as to have a LiCl:LiBr:$GdCl_3$:$YCl_3$ molar ratio of 1:2:0.5:0.5.

In Examples D11 and D19, LiBr, $GdCl_3$, and $YCl_3$ were prepared as raw material powders so as to have a LiBr:$GdCl_3$:$YCl_3$ molar ratio of 3:0.1:0.9.

In Example D16, LiBr, $GdCl_3$, and $YCl_3$ were prepared as raw material powders so as to have a LiBr:$GdCl_3$:$YCl_3$ molar ratio of 3:0.7:0.3.

Solid electrolytes according to D2 to D19 were obtained as in Example D1 except for the types of raw material powders, the molar ratio of the raw material powders, and baking conditions. The baking conditions are shown in Table 4.

Evaluation of Lithium Ion Conductivity

Ionic conductivities of the solid electrolytes according to Examples D1 to D19 were measured as in Example A1. The measurement results are shown in Table 4.

TABLE 4

| Composition | M | δ | x | y | z | Baking treatment temperature (° C.) | Baking treatment time (h) | Conductivity (S/cm) |
|---|---|---|---|---|---|---|---|---|
| Example D1 | $Li_3Gd_{0.7}Y_{0.3}Cl_3Br_3$ | Gd, Y | 0 | 3 | 3 | 0 | 500 | 12 | $2.0 \times 10^{-3}$ |
| Example D2 | $Li_3Gd_{0.5}Y_{0.5}Cl_3Br_3$ | Gd, Y | 0 | 3 | 3 | 0 | 500 | 12 | $1.7 \times 10^{-3}$ |
| Example D3 | $Li_3Gd_{0.3}Y_{0.7}Cl_3Br_3$ | Gd, Y | 0 | 3 | 3 | 0 | 500 | 12 | $1.9 \times 10^{-3}$ |
| Example D4 | $Li_3Gd_{0.9}Y_{0.1}Cl_2Br_4$ | Gd, Y | 0 | 2 | 4 | 0 | 500 | 3 | $2.7 \times 10^{-3}$ |
| Example D5 | $Li_3Gd_{0.67}Y_{0.33}Cl_2Br_4$ | Gd, Y | 0 | 2 | 4 | 0 | 500 | 3 | $2.2 \times 10^{-3}$ |
| Example D6 | $Li_3Gd_{0.5}Y_{0.5}Cl_2Br_4$ | Gd, Y | 0 | 2 | 4 | 0 | 500 | 3 | $2.2 \times 10^{-3}$ |
| Example D7 | $Li_3Gd_{0.3}Y_{0.7}Cl_2Br_4$ | Gd, Y | 0 | 2 | 4 | 0 | 500 | 3 | $2.1 \times 10^{-3}$ |
| Example D8 | $Li_3Gd_{0.1}Y_{0.9}Cl_2Br_4$ | Gd, Y | 0 | 2 | 4 | 0 | 500 | 3 | $2.3 \times 10^{-3}$ |
| Example D9 | $Li_3Gd_{0.9}Y_{0.1}Cl_4Br_2$ | Gd, Y | 0 | 4 | 2 | 0 | 500 | 3 | $3.7 \times 10^{-3}$ |
| Example D10 | $Li_3Gd_{0.5}Y_{0.5}Cl_4Br_2$ | Gd, Y | 0 | 4 | 2 | 0 | 500 | 3 | $3.6 \times 10^{-3}$ |

TABLE 4-continued

| Composition | M | δ | x | y | z | Baking treatment temperature (° C.) | Baking treatment time (h) | Conductivity (S/cm) |
|---|---|---|---|---|---|---|---|---|
| Example D11 $Li_3Gd_{0.1}Y_{0.9}Cl_3Br_3$ | Gd, Y | 0 | 3 | 3 | 0 | 500 | 3 | $2.0 \times 10^{-3}$ |
| Example D12 $Li_3Gd_{0.67}Y_{0.33}Cl_2Br_4$ | Gd, Y | 0 | 2 | 4 | 0 | 470 | 12 | $2.0 \times 10^{-3}$ |
| Example D13 $Li_3Gd_{0.5}Y_{0.5}Cl_2Br_4$ | Gd, Y | 0 | 2 | 4 | 0 | 470 | 12 | $2.0 \times 10^{-3}$ |
| Example D14 $Li_3Gd_{0.3}Y_{0.7}Cl_2Br_4$ | Gd, Y | 0 | 2 | 4 | 0 | 470 | 12 | $1.8 \times 10^{-3}$ |
| Example D15 $Li_3Gd_{0.1}Y_{0.9}Cl_2Br_4$ | Gd, Y | 0 | 2 | 4 | 0 | 470 | 12 | $2.1 \times 10^{-3}$ |
| Example D16 $Li_3Gd_{0.7}Y_{0.3}Cl_3Br_3$ | Gd, Y | 0 | 3 | 3 | 0 | 470 | 12 | $2.0 \times 10^{-3}$ |
| Example D17 $Li_3Gd_{0.5}Y_{0.5}Cl_3Br_3$ | Gd, Y | 0 | 3 | 3 | 0 | 470 | 12 | $1.9 \times 10^{-3}$ |
| Example D18 $Li_3Gd_{0.3}Y_{0.7}Cl_3Br_3$ | Gd, Y | 0 | 3 | 3 | 0 | 470 | 12 | $1.8 \times 10^{-3}$ |
| Example D19 $Li_3Gd_{0.1}Y_{0.9}Cl_3Br_3$ | Gd, Y | 0 | 3 | 3 | 0 | 470 | 15 | $1.8 \times 10^{-3}$ |

DISCUSSION

As is apparent from Tables 1 to 4, the solid electrolytes according to Examples A1 to A34, B1 to B22, C1 to 5, and D1 to D19 have a high ionic conductivity of greater than or equal to $1 \times 10^{-8}$ S/cm at room temperature.

Hereafter, the cases where M includes Gd will be considered.

As is apparent from a comparison of Examples A1 and A25 to A27 with Example A28, when X is Cl and Br and $2 \leq x \leq 4$ is satisfied, a higher ionic conductivity is achieved.

As is apparent from a comparison of Examples A1 and A9 with Examples A8 and A10, when X is two selected from the group consisting of Cl, Br, and I, a higher ionic conductivity is achieved.

Hereafter, the cases where M includes Tb will be considered.

As is apparent from a comparison of Example B2 with Example B1, when X is Cl and Br and x<y is satisfied, a higher ionic conductivity is achieved.

As is apparent from a comparison of Example B9 with Examples B1 and B2, when X is Br, a higher ionic conductivity is achieved compared with the cases where X is Cl and Br.

Hereafter, the cases where M includes Sm will be considered.

As is apparent from a comparison of Examples C2 to C5 with Example C1, when X is at least two selected from the group consisting of Cl, Br, and I, a higher ionic conductivity is achieved.

As is apparent from a comparison of Example C4 with Examples C2 and C3, when X includes Br and I, a higher ionic conductivity is achieved compared with the case where X is Cl and I.

Hereafter, the cases where M includes at least one element selected from the group consisting of Gd, Tb, and Sm will be considered.

As is apparent from comparisons between Example A9 and Example A8, between Example B10 and Example B9, and between Examples C2 and C3 and Example C1, when X is Br and I, a higher ionic conductivity is achieved compared with the cases where X is Br.

As is apparent from comparisons between Example A9 and Example A1 and between Example B10 and Example B1, when X is Br and I, a higher ionic conductivity is achieved compared with the cases where X is Cl and Br.

Accordingly, the solid electrolytes where X includes I have high ionic conductivities.

As is apparent from Examples A9, A19, B10, B21, C2, and C3, the solid electrolytes where X is Br and I have a high ionic conductivity of greater than or equal to $1 \times 10^{-4}$ S/cm.

As is apparent from a comparison of Example A1 with Examples A8 and A9, when X includes Cl, the reduction potential with respect to the potential of the Li electrode can be decreased. Specifically, electrochemical stability of the solid electrolyte with respect to the potential of the Li negative electrode is improved. The evaluation results of the reduction potentials of Examples A1, A8, and A9 show that a higher electronegativity of X improves the stability of the solid electrolyte to reduction.

As is apparent from comparisons between Examples A1 to A5 and Examples A6 and A7, between Examples A11 to A15 and Examples A16 and A17, between Examples B2 to B6 and Examples B7 and B8, and between Examples B13 to B17 and Examples B18 and B19, when the value of δ is greater than or equal to −0.1 and less than or equal to 0.25, the solid electrolytes have a higher ionic conductivity.

As is apparent from comparisons between Examples A11 to A20 and Examples A1 to A10 and between Examples B12 to B22 and Examples B1 to B11, when the value of δ is greater than or equal to −0.25 and less than or equal to 0.25, the solid electrolytes that had been subjected to annealing treatment had ionic conductivities higher than those of the solid electrolytes that had not been subjected to annealing treatment. This is probably because crystallinity of the solid electrolytes was improved by annealing treatment, as shown in FIG. 4.

As is apparent from Table 4, when the element M includes a metal element other than Gd, Tb, and Sm, the solid electrolytes also have a high ionic conductivity.

Since the solid electrolytes according to Examples A1 to A34, B1 to B22, C1 to C5, and D1 to D19 are free of sulfur, no hydrogen sulfide is generated.

As described above, the solid electrolyte according to the present disclosure has high lithium ion conductivity and is suitable for providing a battery that can be satisfactorily charged and discharged.

The solid electrolyte according to the present disclosure is used in, for example, an all-solid lithium ion secondary battery.

What is claimed is:

1. A solid electrolyte represented by composition formula $Li_{3-3\delta}M_{1+\delta}Cl_xBr_yI_z$, wherein:
the following mathematical formulae are satisfied:

$-1 < \delta < 1$, $0 \leq x \leq 6$, $0 \leq y \leq 6$, $0 \leq z \leq 6$, and $x+y+z=6$, and M is at least one element selected from the group consisting of Gd, Tb, and Sm.

2. The solid electrolyte according to claim 1,
wherein at least two of x, y and z are not zero.

3. The solid electrolyte according to claim 1,
wherein a mathematical formula $0<x\leq 6$ is satisfied.

4. The solid electrolyte according to claim 1,
wherein a mathematical formula $0<z\leq 6$ is satisfied.

5. The solid electrolyte according to claim 1,
wherein a mathematical formula $0<y+z\leq 6$ is satisfied.

6. The solid electrolyte according to claim 5,
wherein a mathematical formula $x=0$ is satisfied.

7. The solid electrolyte according to claim 1,
wherein M includes Gd, and
mathematical formulae $z=0$ and $2\leq x\leq 4$ are satisfied.

8. The solid electrolyte according to claim 1,
wherein M includes Tb, and
mathematical formulae $z=0$ and $x<y$ are satisfied.

9. The solid electrolyte according to claim 1,
wherein M includes Sm, and
mathematical formulae $0\leq x<6$, $0\leq y<6$, and $0\leq z<6$ are satisfied.

10. The solid electrolyte according to claim 1,
wherein a mathematical formula $-0.5\leq\delta\leq 0.5$ is satisfied.

11. The solid electrolyte according to claim 10,
wherein a mathematical formula $-0.1\leq\delta\leq 0.25$ is satisfied.

12. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains the solid electrolyte according to claim 1.

13. A solid electrolyte consisting essentially of:
Li, M, and X,
wherein M includes Y and additionally at least one element selected from the group consisting of Gd, Tb, and Sm,
X is at least one element selected from the group consisting of Cl, Br, and I, and
a molar ratio of a total amount of Li, M, and X relative to a total amount of all elements constituting the solid electrolyte is greater than or equal to 90%.

* * * * *